United States Patent
Cox

(10) Patent No.: US 8,205,503 B2
(45) Date of Patent: Jun. 26, 2012

(54) METHOD AND APPARATUS FOR DETECTING THE ROTATIONAL SPEED OF A ROTARY MEMBER

(75) Inventor: Calvin H. Cox, Mirfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 571 days.

(21) Appl. No.: 12/522,136

(22) PCT Filed: Jan. 4, 2008

(86) PCT No.: PCT/GB2008/000027
§ 371 (c)(1),
(2), (4) Date: Jul. 2, 2009

(87) PCT Pub. No.: WO2008/081196
PCT Pub. Date: Jul. 10, 2008

(65) Prior Publication Data
US 2010/0011868 A1 Jan. 21, 2010

(30) Foreign Application Priority Data
Jan. 5, 2007 (GB) .................................. 0700148.0

(51) Int. Cl.
*G01H 1/00* (2006.01)
(52) U.S. Cl. .......................................... 73/660; 367/89
(58) Field of Classification Search .................. 73/660, 73/579, 584, 587, 597, 602, 618, 620, 627, 73/646; 367/89
See application file for complete search history.

(56) References Cited

U.S. PATENT DOCUMENTS

| | | | |
|---|---|---|---|
| 3,395,342 A * | 7/1968 | Pounds .......................... | 324/175 |
| 3,846,701 A * | 11/1974 | Sampey ......................... | 324/175 |
| 4,037,157 A * | 7/1977 | Campbell ...................... | 324/175 |
| 4,061,040 A * | 12/1977 | Shaw ........................... | 73/504.01 |
| 4,259,637 A * | 3/1981 | Bloomfield et al. ............ | 324/166 |
| 4,650,955 A * | 3/1987 | Zaborowski .................. | 219/121.67 |
| 5,043,658 A * | 8/1991 | Braschel et al. ............... | 324/160 |
| 5,097,708 A * | 3/1992 | Kobayashi .................... | 73/593 |

(Continued)

FOREIGN PATENT DOCUMENTS
DE 10011283 A1 9/2001
(Continued)

OTHER PUBLICATIONS

International Search Report and Written Opinion, PCT/GB2008/000027, Jan. 4, 2008, Cummins Turbo Technologies Limited. United Kingdom Search Report GB0700148.0, Mar. 13, 2007, Calvin H. Cox. United Kingdom Search Report GB0700148.0, Mar. 13, 2007, Calvin H. Cox.

*Primary Examiner* — Hezron E Williams
*Assistant Examiner* — Samir M Shah
(74) *Attorney, Agent, or Firm* — Krieg DeVault LLP; Matthew D. Fair

(57) ABSTRACT

The speed of rotation of a rotary member such as a compressor or turbine wheel of a turbocharger is determined by directing an ultrasonic signal into a blade cavity and receiving the reflected signal, which is amplitude modulated by virtue of the passage of the blades across the ultrasonic transducer. The received signal is demodulated to determine the frequency of amplitude modulation of the received signal caused by passage of blades between the first and second locations. This enables the speed of rotation to be calculated. The performance of the turbocharger can thus be optimised in the context of the overall engine system via an engine control module.

30 Claims, 3 Drawing Sheets

U.S. PATENT DOCUMENTS

| | | | |
|---|---|---|---|
| 5,815,092 A * | 9/1998 | Gregg et al. | 340/936 |
| 7,096,134 B2 * | 8/2006 | Miller, Jr. | 702/79 |
| 7,975,780 B2 * | 7/2011 | Siher et al. | 175/57 |
| 2004/0001542 A1 * | 1/2004 | Miller, Jr. | 375/238 |

FOREIGN PATENT DOCUMENTS

| | | |
|---|---|---|
| EP | 1564559 A1 | 8/2005 |
| JP | 2002116218 | 4/2002 |
| WO | WO 02/052298 A1 | 7/2002 |

* cited by examiner (a)

(b)

Trigger level (c)

(d)

METHOD AND APPARATUS FOR DETECTING THE ROTATIONAL SPEED OF A ROTARY MEMBER

The present application is a continuation of PCT/GB2008/000027 filed on Jan. 4, 2008, which claims the benefit of British Patent Application No. 0700148.0 filed Jan. 5, 2007, each of which is incorporated herein by reference.

The present invention relates to a method and apparatus for detecting the rotational speed of a rotary member such as, for example, a compressor or turbine wheel in a turbocharger.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel receives ambient air delivers compressed air to the engine intake manifold, thereby improving the efficiency and power output of the engine. The turbocharger shaft is conventionally supported by journal and thrust bearings, including appropriate lubricating systems, located within a central bearing housing connected between the turbine and compressor wheel housings.

It is desirable to determine the rotational speed of a turbocharger at any given point in time to ensure its performance is optimised in the context of the overall engine system. The detected speed values are fed to an Engine Control Unit ECU (also commonly referred to as an Engine Management System or Engine Control Module) which receives a number of input signals from various system sensors and controls the running of the engine. This is particularly important in engine systems that use exhaust gas recirculation (EGR) in which controlled amounts of exhaust gas are supplied to the intake manifold of the engine. In such engine systems the rotational speed of the turbocharger has to be controlled carefully to ensure that the exhaust pressure is greater than that at the compressor intake, whilst not exceeding the operating limits of turbocharger rotational speed.

The interior of a turbocharger compressor or turbine is a harsh environment that is subject to high temperatures and pressures as well as significant vibration. It is therefore not suitable for many transducers and others produce unreliable or unclear output signals in view of interference and noise. It is known to estimate the speed of rotation of a turbocharger from other sensed variables such as, for example, the compressor air inlet temperature and pressure, the pressure of the compressor outlet air at the intake manifold of the engine and the engine rotation speed. It is also known to take a direct measurement of turbocharger rotational speed by using a variable reluctance sensor associated with the turbocharger shaft, or by embedding magnetic elements in the housing or a blade of the compressor or turbine wheel.

It is an object of the present invention to provide for an alternative and more reliable method of determining the speed of rotation of a rotating body such as a compressor or turbine wheel.

According to a first aspect of the present invention there is provided a method for determining the speed of rotation of a rotary member about an axis of rotation, the rotary member comprising a rotor and a plurality of blades extending therefrom and disposed around the rotor to define a plurality of cavities therebetween, the method comprising directing an ultrasonic signal transmission into the blade cavities as the rotary member is rotating, receiving the reflected signal and determining the frequency of amplitude modulation of the received signal caused by passage of the blades across the path of the transmitted signal and deriving therefrom the speed of rotation.

The signal transmission may be continuous or may be sent in discrete intervals.

The signal may be transmitted from a first location and is received at a second location, the amplitude modulation being caused by passage of the blades between said locations.

The method may further comprise the step of directing the ultrasonic signal from a position located adjacent to the radial periphery of the blades. The ultrasonic signal may be directed through a port in a housing that encloses the rotating body. The reflected signal may be received through the same or a second port in said housing. In the latter case the said second port is adjacent to said first port through which the signal is transmitted. The first and second ports may be divergent.

An ultrasonic waveguide may be used to direct the signal towards the blade cavities and an ultrasonic waveguide may be used to receive the reflected signal. In the case of a combined transmitter/receiver the waveguide directs both signals.

The ultrasonic signal may be generated by using a piezoelectric transmitter or transceiver.

A piezoelectric receiver or transceiver may be used to receive and to detect the reflected signal.

Frequency demodulation may be applied to the reflected signal to recover a signal whose frequency is representative of vibration of the blades.

The method may also comprise the step of determining variations in amplitude and separation of peaks of the received signal to detect physical imbalance and torsional distortion of the rotary member.

According to a second aspect of the present invention there is provided a method for determining the speed of rotation of a compressor or turbine wheel in accordance the method defined above.

According to a third aspect of the present invention there is provided a method for operating a turbocharger including determining the speed of rotation of a turbocharger having a compressor and a turbine wheel in accordance with the method referred to above.

According to a fourth aspect of the present invention there is a method for determining the vibration of a rotary member that comprises a rotor and a plurality of blades extending therefrom and disposed around the rotor to define cavities therebetween, the method comprising directing an ultrasonic signal into a blade cavity, receiving the reflected signal and applying frequency demodulation to the reflected signal to recover a signal whose frequency is representative of vibration of the blades.

According to a fifth aspect of the present invention there is provided apparatus for determining the speed of rotation of a rotary member that comprises a rotor and a plurality of blades extending therefrom and disposed around the rotor to define cavities therebetween, the apparatus comprising an ultrasonic transducer disposed adjacent to a periphery of the swept blade volume, the transducer comprising a transmitter arranged to direct an ultrasonic signal into the cavities between the blades and a receiver for receiving reflected signals, and a processor configured for processing the received signals and to determine the frequency of amplitude modulation of the received signal.

The transmitter and receiver may be separate and positioned at adjacent locations or may be combined in a single transceiver.

The blades of the rotary member may have a complex curvature configured to redirect gas flow in said cavities in a desired manner. The blades may also be backswept.

The apparatus may be mounted on or within a housing for the rotary member, with ports being provided in the housing, said ports providing communication with the blade cavities.

According to a sixth aspect of the present invention there is provided a compressor or turbine comprising a wheel disposed in a housing, the wheel having a rotor and a plurality of blades extending therefrom and disposed around the rotor to define cavities therebetween, and apparatus for determining the speed of rotation of the wheel as defined above.

According to a seventh aspect of the present invention there is provided a turbocharger comprising a compressor and a turbine in accordance with the preceding definition.

A specific embodiment of the present invention will now be described, by way of example only, with reference to the accompany drawings, in which.

Figure 1:
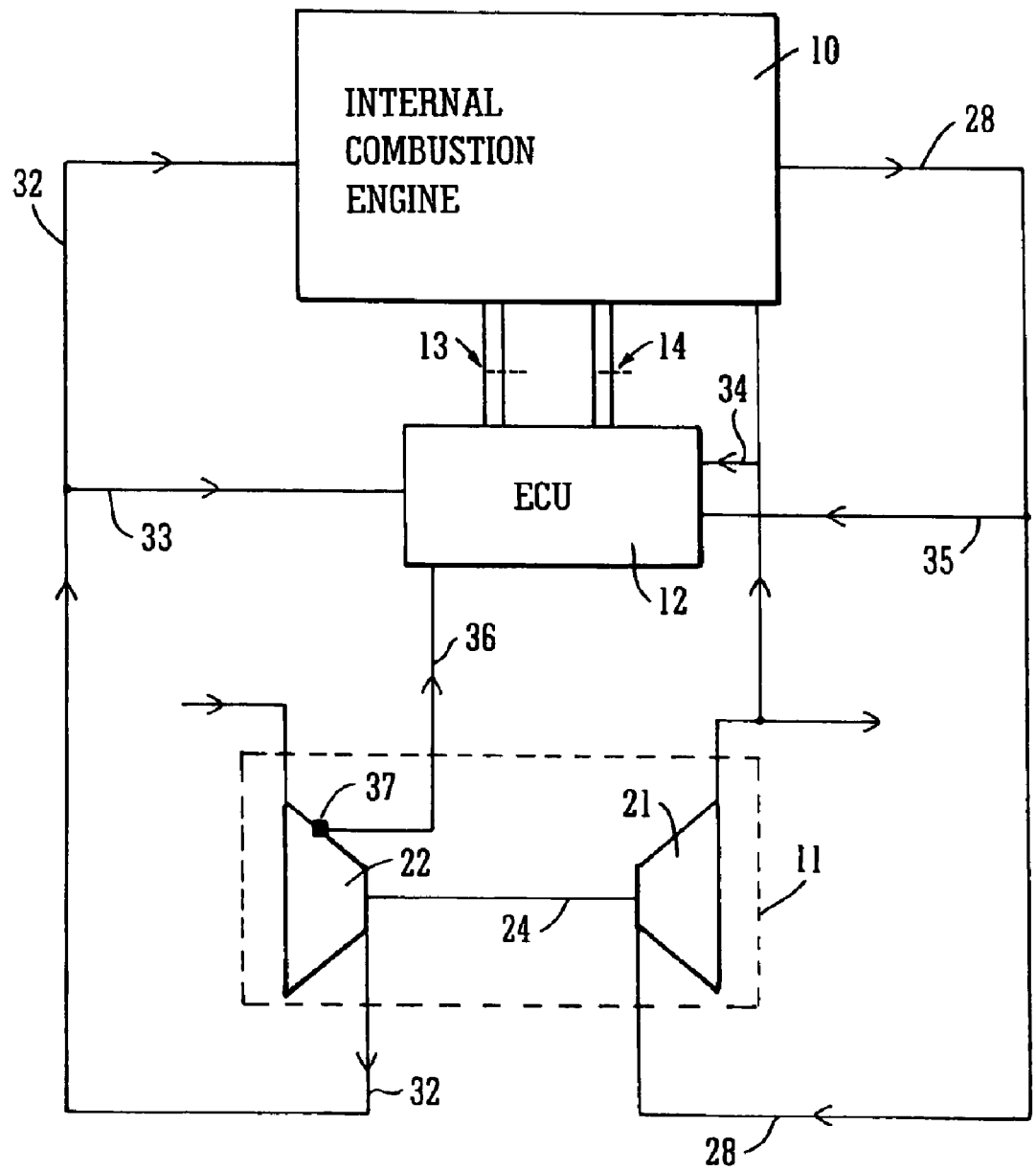
FIG. 1 is a block diagram showing an engine system incorporating a turbocharger having speed sensing apparatus in accordance with one aspect of the present invention.
Figure 2:
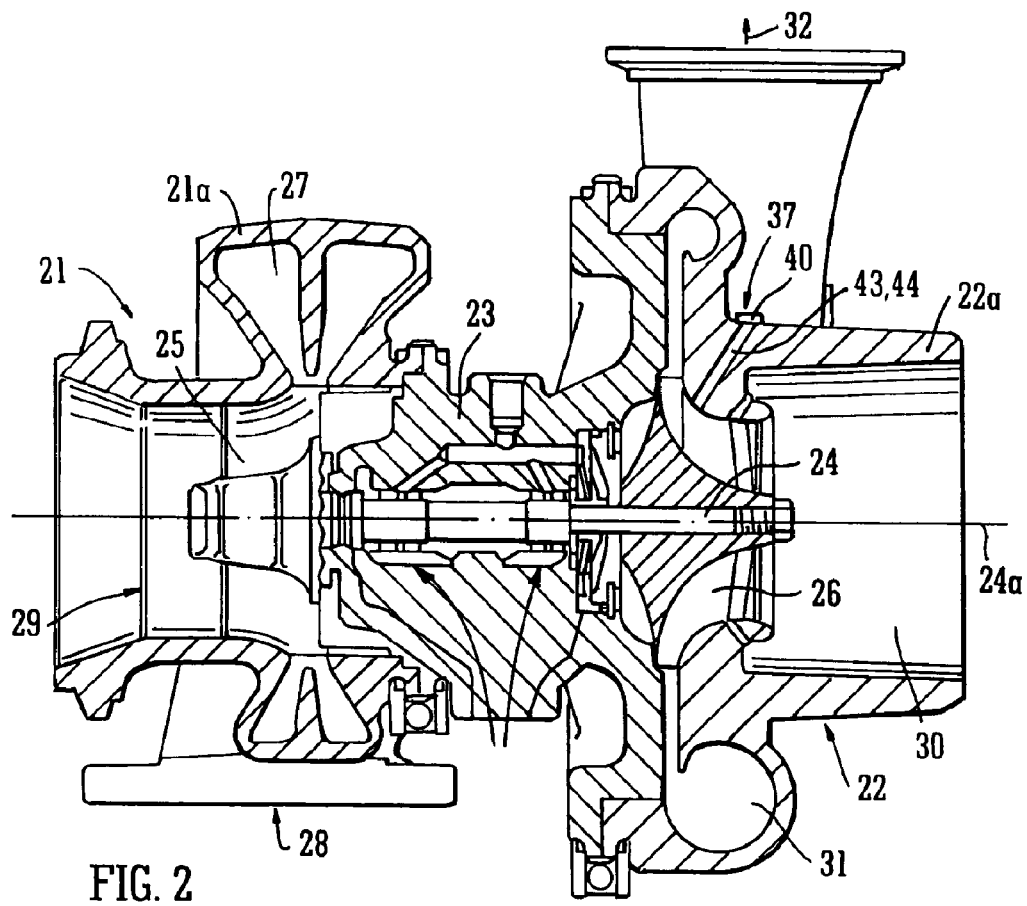
FIG. 2 is an axial cross-section through an exemplary turbocharger embodiment in accordance with one aspect of the present invention.

Referring now to FIGS. 1 and 2, the speed sensing method and apparatus of the present invention is shown in relation to an internal combustion engine 10 and turbocharger 11. The operation of the internal combustion engine 10 is controlled by an engine control module (ECM) 12 that receives input signals 13 from a plurality of transducers disposed at suitable locations in the system, the signals containing information relating to the system performance. The ECM 12 is microprocessor-based and generates output control signals 14 that govern performance as is well known in the art.

The turbocharger 11 comprises a turbine 21 and a compressor 22 interconnected by a central bearing housing 23. A turbocharger shaft 24 extends from the turbine 21 to the compressor 22 through the bearing housing 23 and supports at one end a turbine wheel 25 for rotation within a turbine housing 21a and, at the other end a compressor wheel 26 for rotation within a compressor housing 22a. The shaft 24 rotates about turbocharger axis 24a on bearing assemblies located in the bearing housing 23. The turbine housing 21a defines an inlet chamber 27 (typically a volute) to which exhaust gas 28 from the internal combustion engine 10 is delivered. The exhaust gas flows 28 from the inlet chamber 27 to an axially extending outlet passageway 29 via the turbine wheel 25 causing it to rotate and, as a result, torque is applied to the shaft 24 to drive the compressor wheel 26. Rotation of the compressor wheel 26 within the compressor housing 22a pressurises ambient air drawn in through an air inlet 30 and delivers the pressurised air to an air outlet volute 31 from where it is fed to an inlet manifold of the internal combustion engine 10 as indicated by line 32 in FIG. 1 and arrow 32 in FIG. 2. The speed of the turbine wheel 25 is dependent upon the velocity of the gas passing from the inlet chamber 27 to the outlet passageway 29 and governs the speed of rotation of the compressor wheel 26.

As mentioned above the ECM 12 receives signals not only from the internal combustion engine 10 but also from several transducers elsewhere the system. For example, and as shown in FIG. 1, a pressure or volumetric flow rate signal 33 may be received from a transducer associated with the compressor outlet/engine intake manifold, a similar signal 34 from the turbine outlet recirculation and a similar signal 35 from the turbine inlet or engine exhaust 28. Furthermore, in accordance with an aspect of the invention a rotational speed signal 36 is received from speed sensing apparatus 37 associated with the compressor 22. It will be appreciated that these signals are shown for illustrative purposes only and do not represent an exhaustive or essential list of possible parameters that may be monitored by the ECM 12.

A compressor or turbine wheel typically comprises a wheel having a rotor or hub that carries a plurality of blades that extend outwardly therefrom to a position just clear of the internal surface of the housing. The blades are equi-angularly spaced around the hub thereby defining passages or cavities therebetween. Each blade has a complexly curved profile that is fundamental to the aerodynamic performance of the compressor or turbine.

Figure 3A:
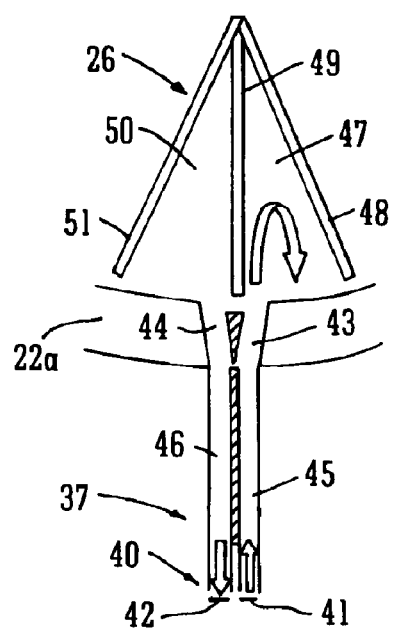
FIGS. 3a and 3b are diagrammatic representations illustrating the operation of one embodiment of speed sensing apparatus in accordance with one aspect of the present invention, with only part of the compressor being shown.
Figure 3B:
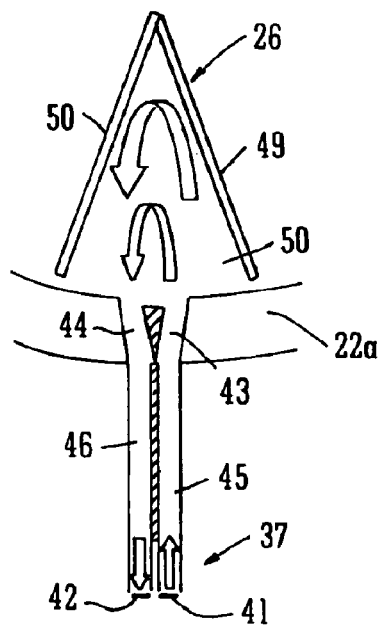

In the exemplary embodiment of FIG. 2, the speed sensing apparatus 37 comprises an ultrasonic transducer 40 mounted on the exterior of the compressor housing 22a. It comprises an ultrasonic piezoelectric transmitter 41 and a separate receiver 42 connected to respective adjacent divergent ports 43, 44 in the wall of the housing 22a by parallel waveguides 45, 46. The ports 43, 44 are open to the interior of the compressor housing 22a. The operation of the sensing apparatus is illustrated by the diagrams of FIGS. 3a and 3b in which the blades and intermediate cavities of the compressor wheel are represented schematically. An ultrasonic high frequency signal (e.g. typically in the region of 1 MHz) emitted from the transmitter 41 enters the inside of the compressor housing 22a via the waveguide 45 and port 43 shown on the right in a direction transverse to the turbocharger axis of rotation 24a. In FIG. 3a, the position of the compressor wheel 26 is such that the right hand port 43 is in communication with a first cavity 47 between blades 48, 49 and the left hand port is in communication with an adjacent second cavity 50 defined between blades 49 and 51. In this scenario, reflection of the transmitted signal detected at the receiver 42 is significantly attenuated as there is no direct path to the receiver 42 as the blade 49 between the first and second cavities 47, 50 effectively bisects the signal and forms a barrier to significant signal transference i.e it is acoustically decoupled. In FIG. 3b, the compressor wheel 26 is shown at a slightly offset rotational position in which a single cavity 50 between adjacent blades 49, 51 is in direct communication with the two ports 43, 44. In this instance the cavity serves as a resonant chamber and the transmitted signal is acoustically coupled to the receiver by the cavity such that signal detected by the receiver 42 is not attenuated significantly.

The received signal is thus effectively amplitude modulated by the passing blades as the compressor wheel rotates. Preliminary tests have established that a modulation of greater than 60% is achieved in the received signal, which can be demodulated to determine the frequency of rotation of the compressor wheel 22 and therefore the turbocharger from which the speed of rotation is derived. Moreover, variations in amplitude and separation between peaks in the received signal can be used to detect physical imbalance of the wheel and torsional distortion.

Figure 4:
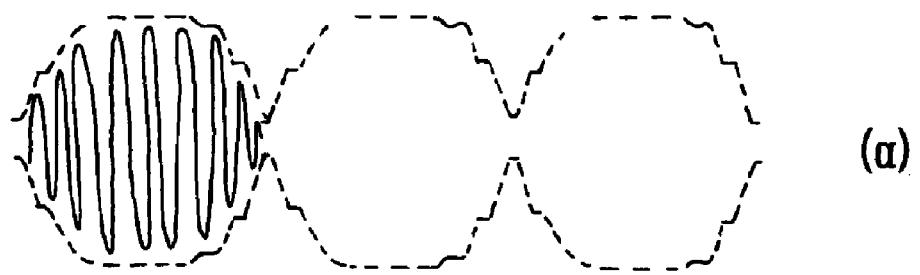
FIG. 4 shows a typical waveform received by the sensing apparatus of FIGS. 3a and 3b.
Figure 4:
Figure 4:
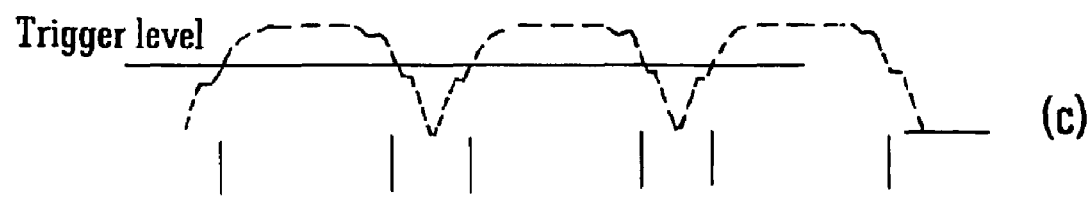
Figure 4:

An example of a transmitted and received signal is shown in FIG. 4. The received wave is shown at FIG. 4a and the amplitude modulation, caused by the alternate acoustic coupling and decoupling of the transmitter to the receiver through the blade cavities passing under the transducer, is evident.

The received wave is then processed using conventional signal processing techniques to ascertain the frequency of the amplitude modulation and therefore the frequency of rotation of the turbocharger. The amplitude modulation signal is passed through a narrow band filter and rectified to obtain the dc waveform shown in FIG. 4b. The signal is then passed through a narrow band demodulator at carrier frequency (of the transmitted ultrasonic signal) in order to isolate the low frequency component that has been rectified and then passed through a threshold detector (FIG. 4c) to obtain the square wave of FIG. 4d. This trigger circuit will include hysteresis and noise filtering. The frequency of the output square wave is representative of the frequency of the amplitude modulation caused by the wheel and therefore is representative of the speed of rotation of the wheel.

In a turbocharger compressor, the maximum blade pass frequency would typically be in the region of 30 kHz. To be effective the transducer should be capable of sensing at six times this frequency.

The use of a sensor of this kind is advantageous compared to existing technology for many reasons. In particular, the sensor is resistant to interference and is suitable for the high temperature environment inside a turbocharger housing. Further, since the receiver frequency can be locked to the transmitter frequency in an ultrasonic sensor of this kind it is relatively straightforward to eliminate noise by routine signal processing. Indeed the signal processing is simplified as the strength and frequency of the received signal is to a large extent independent of the turbocharger speed. Moreover, a piezoelectric transducer is a solid-state device and does not suffer fatigue in the same manner as a diaphragm of a pressure sensor. The use of a waveguide (which can be any suitable form of passage or tube) in the wall of the compressor housing permits the sensor to be located at a distance from hot interior of the compressor.

The arrangement of the present invention could be used to determine blade vibration. As the blades rotate they generate sound energy that effectively modulates the carrier frequency of the transmitted ultrasonic signal. This will vary with the rotational position of the blades relative to the receiver and will be influenced by Doppler shift. Signal processing is used to apply frequency demodulation to the received signal so as to separate out a vibration signal from the reflected carrier signal. This may be achieved by periodically turning off the transmitted signal and using the receiver to sense an ultrasonic component generated by the resonating blade.

In an alternative embodiment the ultrasonic transducer may comprise a single transceiver that can be switched between transmitter and receiver mode. In transmitter mode, a signal having a frequency equivalent to the natural resonance of the transducer is transmitted into the blade cavity in the usual way and the transceiver is switched to receiver mode. The reflected wave excitations still in motion will excite the receiver to an extent governed by the cavity exposure. The switching frequency would typically be in the region of 200 kHz with 2 mHz modulation.

It will be appreciated that the sensing device of the present invention can be retro-fitted to existing turbochargers.

It is to be appreciated that numerous modifications to the above described embodiments may be made without departing from the scope of the invention as defined in the appended claims. For example, the exact configuration and location of the sensing device may differ depending on the application. In particular, the ports need not be divergent and the waveguides need not be parallel. It will be appreciated that the method and device can be used in relation to a turbine wheel of a turbocharger as opposed to the compressor wheel and that the invention has application to determining the rotation speed of any bladed wheel of this kind. It is also to be understood that other ultrasonic transducer signal frequencies may be employed to the same effect e.g. microwaves.

The invention claimed is:

1. A method for determining the speed of rotation of a rotary member about an axis of rotation, the rotary member comprising a rotor and a plurality of blades extending therefrom, said blades disposed around the rotor to define a plurality of blade cavities therebetween, the method comprising directing an ultrasonic signal transmission into the blade cavities as the rotary member is rotating, receiving a reflected signal and determining a frequency of amplitude modulation of the reflected signal caused by passage of the blade cavities across the path of the transmitted signal and deriving therefrom the speed of rotation.

2. A method according to claim 1, wherein the ultrasonic signal transmission is directed into the blade cavities and the reflected signal is alternately acoustically coupled and decoupled from a receiver at which the reflected signal is received by virtue of the rotation of the blades and the blade cavities past the receiver.

3. A method according to claim 1, wherein the ultrasonic signal transmission originates from a first location and the reflected signal is received at a second location, the amplitude modulation being caused by passage of the blades between said locations.

4. A method according to claim 1, further comprising the step of directing the ultrasonic signal transmission from a position located adjacent to a radial periphery of the blades.

5. A method according to claim 4, wherein the ultrasonic signal transmission is directed through a first port in a housing that encloses the rotating body.

6. A method according to claim 5, wherein the reflected signal is received through a second port in said housing, said second port being adjacent to said first port.

7. A method according to claim 6, wherein said first and second ports are divergent.

8. A method according to claim 1, wherein an ultrasonic waveguide is used to direct the ultrasonic signal transmission towards the blade cavities.

9. A method according to claim 1, wherein an ultrasonic waveguide is used to direct the reflected signal.

10. A method according to claim 1, further comprising the step of generating the ultrasonic signal transmission by using a piezoelectric transducer.

11. A method according to claim 10, further comprising the step of using a separate piezoelectric transmitter and receiver to transmit and receive the ultrasonic signal transmission and the reflected signal, respectively.

12. A method according to claim 1, further comprising the step of applying frequency demodulation to the reflected signal to recover a signal whose frequency is representative of vibration of the blades.

13. A method according to claim 1, further comprising the step of determining variations in amplitude and separation of peaks of the received signal to detect physical imbalance and torsional distortion of the rotary member.

14. A method for determining the speed of rotation of a compressor or turbine wheel in accordance with claim 1.

15. A method for operating a turbocharger including determining the speed of rotation of a turbocharger having a compressor and a turbine wheel in accordance with claim 1.

16. A method for determining the vibration of a rotary member that comprises a rotor and a plurality of blades extending therefrom, said blades disposed around the rotor to define blade cavities therebetween, the method comprising directing an ultrasonic signal transmission into the blade cavities as the rotary member is rotating, receiving a reflected signal and applying frequency demodulation to the reflected signal to recover a signal whose frequency is representative of vibration of the blades.

17. A method according to claim 16, wherein the ultrasonic signal transmission originates from a first location and is received at a second location.

18. A method according to claim 16, wherein the ultrasonic signal transmission propagates in a direction transverse to the axis of rotation.

19. Apparatus for determining the speed of rotation of a rotary member that comprises a rotor and a plurality of blades extending therefrom, said blades disposed around the rotor to define blade cavities therebetween, the apparatus comprising an ultrasonic transducer disposed adjacent to a periphery of the swept blade volume, the transducer comprising a transmitter arranged to direct an ultrasonic signal into the blade cavities between the blades whilst the rotary member is rotating and a receiver for receiving reflected signals, and a processor configured for processing the received signals and determining a frequency of amplitude modulation of the reflected signals.

20. Apparatus according to claim 19, wherein the transmitter is located at a position adjacent to the receiver.

21. Apparatus according to claim 19, wherein the blades have a complex curvature configured to redirect gas flow in said blade cavities in a desired manner.

22. Apparatus according to claim 19, further comprising provided waveguides for the transmitted and reflected signals.

23. Apparatus according to claim 19, wherein the transducer is piezoelectric.

24. Apparatus according to claim 19, mounted on or within a housing for the rotary member, with at least one port being provided in the housing, said port providing communication with the blade cavities.

25. Apparatus according to claim 24, wherein the ultrasonic transmitted signal is directed through a first port in the housing.

26. Apparatus according to claim 25, wherein the reflected signal is received through a second port in said housing, said second port being adjacent to said first port.

27. Apparatus according to claim 26, wherein said ports are divergent.

28. Apparatus according to claim 19, wherein the transmitter and receiver are alternately acoustically coupled and decoupled by passing blade cavities.

29. A compressor or turbine comprising a wheel disposed in a housing, the wheel having a rotor and a plurality of blades extending therefrom, said plurality of blades disposed around the rotor to define blade cavities therebetween, and an apparatus for determining the speed of rotation of the wheel in accordance with claim 19.

30. A turbocharger comprising a compressor and a turbine, said compressor and/or said turbine being in accordance with claim 29.

* * * * *